United States Patent

Gourley

[11] 4,052,379
[45] Oct. 4, 1977

[54] DYES FROM TRIFLUOROMETHYL-2-AMINOBENZO-THIAZOLE DIAZO COMPONENTS

[75] Inventor: Robert Nicholas Gourley, Rainford, England

[73] Assignee: Eastman Kodak Company, Rochester, N.Y.

[21] Appl. No.: 641,787

[22] Filed: Dec. 18, 1975

[51] Int. Cl.² .................... C09B 29/08; C09B 29/26; C09B 29/36; D06P 1/18
[52] U.S. Cl. .................... 260/155; 260/158; 260/283 CN; 260/287 R; 260/288 R; 260/305; 260/454; 260/465 E; 260/551 S; 260/573; 260/577; 544/105
[58] Field of Search .................... 260/158, 155

[56] References Cited

U.S. PATENT DOCUMENTS

| | | | |
|---|---|---|---|
| 2,149,051 | 2/1939 | Helberger et al. | 260/158 |
| 2,726,237 | 12/1955 | Towne et al. | 260/158 |
| 2,730,523 | 1/1956 | Dickey et al. | 260/158 |
| 2,746,953 | 5/1956 | Dickey et al. | 260/158 |
| 3,143,540 | 8/1964 | Meen et al. | 260/155 |
| 3,349,075 | 10/1967 | Wallace et al. | 260/158 |
| 3,455,898 | 7/1969 | Seefelder et al. | 260/158 |
| 3,787,388 | 1/1974 | Weaver et al. | 260/155 |

Primary Examiner—Floyd D. Higel
Attorney, Agent, or Firm—Donald W. Spurrell; Daniel B. Reece, III

[57] ABSTRACT

Azo dyes having the general formula:

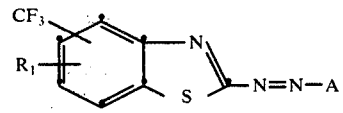

wherein $R_1$ represents a substituent selected from the group consisting of hydrogen, methyl, ethyl, methoxy, ethoxy, halogen, nitro, acetyl, carbomethoxy, carboethoxy, cyano and thiocyanate, and A is an aniline, 1,2,3,4-tetrahydroquinoline or benzomorpholine coupling component, may be used as conventional disperse dyes on polyester, polyamide, acrylic, triacetate and other synthetic fabrics, and some are particularly suitable for use in the transfer printing of polyesters and polyamides.

12 Claims, No Drawings

DYES FROM TRIFLUOROMETHYL-2-AMINOBENZOTHIAZOLE DIAZO COMPONENTS

This invention relates to dyestuffs and the use thereof and, more particularly, to azo compounds containing a trifluoromethyl-2-aminobenzothiazole diazo component, and to synthetic fibers colored therewith.

In accordance with the present invention, there are provided azo dyes having the general formula:

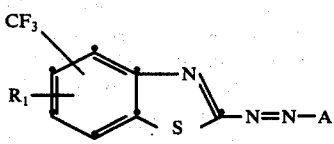

wherein $R_1$ represents a substituent selected from the group consisting of hydrogen, methyl, ethyl, methoxy, ethoxy, halogen, nitro, acetyl, carbomethoxy, carboethoxy, cyano and thiocyanate; and A is an aniline, 1,2,3,4-tetrahydroquinoline or benzomorpholine coupling component. Such couplers are bonded to the azo group by an aromatic ring carbon atom in the position para to the nitrogen atom of the coupler nucleus, i.e., the 4-position of the aniline, and 6-position of the tetrahydroquinoline, and the 7-position of the benzomorpholine coupling components.

Typical of the coupling components represented by A are those having the formulas:

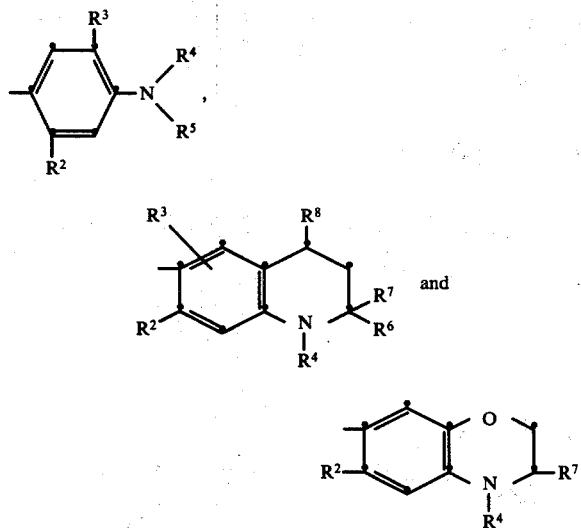

wherein $R^2$ is hydrogen, lower alkyl, lower alkoxy, halogen, trifluoromethyl or a group having the formula —NH-acyl; $R^3$ is hydrogen, lower alkyl or lower alkoxy; $R^4$ individually is alkyl containing one to eight carbon atoms; cyclohexyl; cyclohexyl substituted with lower alkyl; or lower alkyl substituted with lower alkoxy, aryl, aryloxy, cyclohexyl, alkyl or arylsulfonyl, cyano, hydroxy, halogen, lower alkanoyloxy, lower alkoxycarbonyl, lower alkoxycarbonyloxy, aroyloxy, lower alkylcarbamoyloxy, arylcarbamoyloxy, alkylcarbamoylamino, arylcarbamoylamino, or a group having the formula:

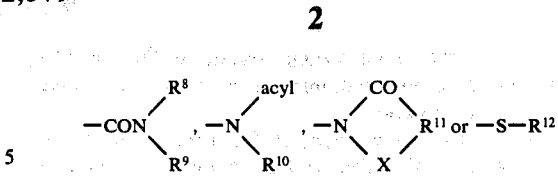

wherein $R^8$ individually is hydrogen lower alkyl or aryl; $R^9$ individually is hydrogen or lower alkyl; $R^8$ and $R^9$ collectively are —(CH$_2$)$_5$— or —CH$_2$CH$_2$—OCH$_2$CH$_2$—; $R^{10}$ is hydrogen, lower alkyl, aryl or cyclohexyl; $R^{11}$ is ethylene, propylene, trimethylene, o-cyclohexylene, or o-arylene; X is —CH$_2$—, CO—, or —SO$_2$—; and $R^{12}$ is aryl, benzyl, cyclohexyl, 1,2,4-triazol-3-yl, or 2-benzothiazolyl; $R^5$ individually is hydrogen; lower alkyl, lower alkyl substituted with lower alkoxy, aryl, aryloxy, cyclohexyl, lower alkanoyloxy, lower alkoxycarbonyl or lower alkoxycarbonyloxy; or aryl; $R^4$ and $R^5$ in combination is a group having the formula —CH$_2$CH$_2$—Y—CH$_2$CH$_2$— in which Y is —CH$_2$—, —O—, or —SO$_2$—. $R^6$ is methyl or, when $R^7$ and $R^8$ each is hydrogen, $R^6$ can be lower alkyl; and $R^7$ and $R^8$ each is hydrogen or methyl.

The dyes provided by the present invention may be used as conventional disperse dyes on polyester, polyamide, acrylic, triacetate and other synthetic fabrics, and some are particularly suitable for use in the transfer printing of polyesters and polyamides.

The known techniques of transfer printing are described in an article by D. Burtonshaw, *International Dyer and Textile Printer*, 335–340, 1971. In the most widely used technique, which is the one to which the present invention also relates, a dye capable of sublimation is applied to a non-textile support such as paper or other suitable medium, and the dye is transferred by the action of heat to a contiguous material.

Also in accordance with the present invention, there is provided a transfer printing sheet comprising a non-textile support bearing a disperse azo dye having the formula given above.

Preferably the dye is in a binder, for example, a suitable synthetic, semi-synthetic or natural resin. Cellulose esters and ethers may be used as binders.

The non-textile support may be paper, e.g., paper of low porosity, or metal, e.g., an aluminum foil, or a plastics film. All of these supports may be attached to another support on the non-dye-bearing side.

The dye may be applied in a printing ink by the flexographic, gravure, letterpress, silk screen or lithographic process. The dye will usually, although not necessarily, be applied in an imagewise distribution. More than one dye may be applied to the support.

Also, according to the present invention, there is provided a method of transfer printing a fabric or film of a polyester or polyamide, which comprises placing the dye-bearing side of a transfer printing sheet as defined above in contact with the fabric or film and subjecting the sheet and fabric or film to heat to transfer at least some of the dye from the sheet to the fabric or film.

The transfer of the dye may take place at a temperature of 180° C. to 230° C. Increased pressure may be used, for example up to 1.5 lb./sq. in. Apparatus is commercially available for performing transfer printing.

Also according to the present invention, there is provided a fabric or film of a polyester or polyamide which has been transfer printed by a method as defined above.

Also according to the present invention, there is provided a printing ink containing a disperse dye having the formula given above.

The materials and methods of the present invention may be used to apply a dye or dyes to various polyesters and polyamides. These polymers may be in the form of coatings on other substrates, e.g., metal, leather, cotton or wool. The polymers may be in the form of woven, knitted, bonded or laminated fabrics, or pile fabrics, e.g., carpets.

The couplers which can be used in preparing our novel azo compounds can be obtained by published procedures or techniques analogous thereto. The substituents encompassed by the generic terminology set forth above are well-known in the art of azo dyes. As used herein to describe a substituent containing an alkyl moiety, "lower" designates a carbon content of one to four carbon atoms.

Each aryl moiety of the aryl- and arylene-containing groups, e.g., aroyloxy, phthalimido, arylthio, etc., which our compounds can contain preferably is phenyl, phenylene, and phenyl and phenylene substituted with lower alkyl, lower alkoxy, lower alkoxycarbonyl or halogen such as a chlorine or bromine atom.

The organic acyl radicals represented by "acyl" preferably are formyl, lower alkanoyl, aroyl, cyclohexoyl, lower alkoxycarbonyl, aryloxycarbonyl, lower alkylsulfonyl, cyclohexylsulfonyl, arylsulfonyl, carbamoyl, lower alkylcarbamoyl, arylcarbamoyl, etc. The alkanoyl groups can be substituted with substituents such as halogen, aryl, cyano, lower alkoxy, aryloxy, benzyloxy, etc. The alkoxycarbonyl groups can be substituted, for example, with hydroxy, alkoxy and cyano. The unsubstituted and substituted alkanoyl, aroyl, and alkoxycarbonyl groups are preferred.

A group of our compounds which are especially preferred are those having the formulas:

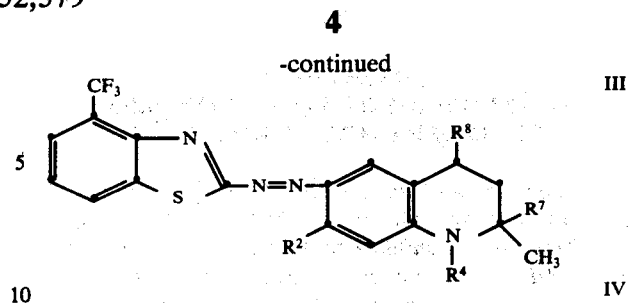

wherein $R^2$ is hydrogen, methyl, lower alkanoylamino, benzamido or lower alkoxycarbonylamino; $R^3$ is methyl, methoxy or hydrogen, or when $R^5$ is hydrogen, $R^3$ is methyl or methoxy; $R^4$ is lower alkyl, cyclohexyl, benzyl, cyclohexylmethylene, 2-cyanoethyl, 2-carbamoylethyl, N-lower alkyl-2-carbamoylethyl; N,N-di-lower alkyl-2-carbamoylethyl; or the group —Z—$R^{13}$ in which Z is ethylene, propylene or trimethylene and $R^{13}$ is hydroxy, lower alkanoyloxy, lower alkoxycarbonyl, lower alkoxycarbonyloxy, succinimido, glutarimido, phthalimido, aroyloxy, lower alkoxy, alkanoylamino, lower alkylaminocarbonyloxy, lower alkylaminocarbonylamino, or lower alkoxycarbonylamino; $R^5$ is hydrogen, lower alkyl, cyclohexyl, arylmethyl, cyclohexylmethyl, or the group —Z—$R^{13}$ described above; and $R^7$ and $R^8$ each is hydrogen or methyl; each aryl moiety is phenyl, tolyl, anisyl, ethoxyphenyl or chlorophenyl. When $R^4$ and $R^5$ both represent substituents conforming to the formula —Z—$R^{13}$, the Z groups preferably are the same.

The azo compounds or our invention are synthesized by diazotizing a trifluoromethyl-2-aminobenzothiazole and coupling the resulting diazonium salt with an aniline, tetrahydroquinoline or benzomorpholine disperse azo dye coupler having the formula H-A. The diazo precursors are obtained according to the following reaction sequence:

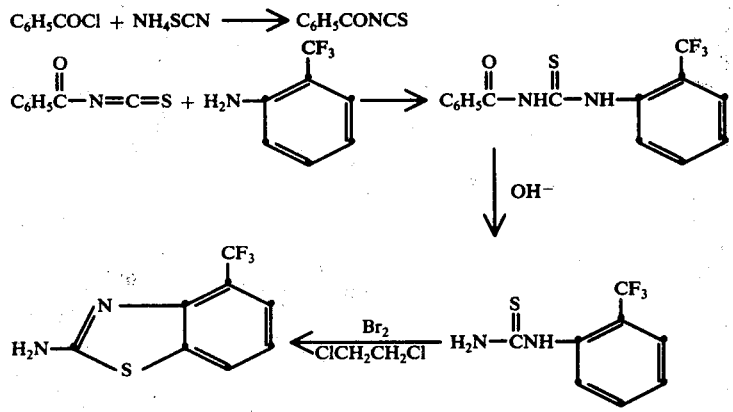

The disperse azo dye coupling components represented by A are characterized by being devoid of ionic substituents, such as carboxylate, sulfonate and ammonium groups capable of rendering our novel azo compound completely water soluble when present in aqueous dyebath in concentrations commonly used in disperse dyeing techniques. The coupling components of our novel compound are described extensively in the literature, including the following patents, which are incorporated herein by reference:

U.S. 2,249,749    U.S. 3,161,632    U.S. 3,359,256

| | -continued | |
|---|---|---|
| U.S. 2,249,774 | U.S. 3,206,452 | U.S. 2,891,942 |
| U.S. 2,251,947 | U.S. 3,336,285 | U.S. 3,268,507 |
| U.S. 2,286,795 | U.S. 3,349,075 | U.S. 2,967,858 |
| U.S. 2,309,129 | U.S. 3,370,055 | U.S. 2,971,953 |
| U.S. 2,436,100 | U.S. 3,379,711 | U.S. 3,117,956 |
| U.S. 2,683,708 | U.S. 3,380,990 | U.S. 3,122,410 |
| U.S. 2,683,709 | U.S. 3,386,988 | U.S. 3,178,405 |
| U.S. 2,726,237 | U.S. 3,423,394 | U.S. 3,206,454 |
| U.S. 2,773,054 | U.S. 3,424,741 | U.S. 3,329,669 |
| U.S. 2,785,157 | U.S. 3,429,871 | U.S. 3,342,800 |
| U.S. 2,805,218 | U.S. 3,442,886 | U.S. 3,398,135 |
| U.S. 3,148,180 | U.S. 2,092,398 | U.S. 3,406,165 |
| | | U.S. 3,407,189 |

The novel disperse azo dye compounds of this invention produce bright scarlet to violet shades on polyester, cellulose acetate and polyamide fibers which exhibit good fastness to light and wet treatments such as crock and rub, and good dyeing properties such as build, leveling and exhaustion. The characteristics of these novel compounds will vary depending on the particular coupling component A.

The azo dye compounds of Formulas II, III and IV are particularly suitable for use in the transfer printing of polyester and polyamide fibers, especially when $R^4$ and $R^5$ are restricted to less than six carbon atoms. They have good volatility, and give bright scarlet to bluish-red shades on polyesters and polyamides, with good fastness to light and to wet treatments.

Selected azo dye compounds of Formulas II, III and IV are suitable for use in thermosol and exhaust dyeing of polyester and polyester/cellulosic fabrics and yarns. Additionally, they exhibit good to excellent stability over a pH range of 4 to 8 when applied to textured polyester fibers at elevated temperatures, e.g., 250° to 265° F. The good dyeability properties of these compounds render them fast to crocking and result in good build and barre coverage.

Dyes of formula II where $R_2$ and $R_3$ represents methyl substituents and $R_5$ is hydrogen have particularly good lightfastness on polyamides.

A typical preparation of the diazo precursor is as follows:

To a stirred solution of 7.9 g. (0.104 m.) of ammonium thiocyanate in 30 ml. of acetone is added at 30° C., 13.25 g. (0.094 m.) of benzoyl chloride. The mixture is stirred under reflux for 10 min., cooled to 50° C., and 15.1 g. (0.094 m.) of 2-aminobenzotrifluoride is added in one portion. The mixture is stirred under reflux for 20 min. A solution of 13.2 g. of sodium hydroxide in 140 ml. of water is added. The mixture is boiled for 15 min. and the clear solution is cooled to 20° C. The pH of the mixture is adjusted to 5 with 21 ml. of conc. HCl and then made just alkaline by the addition of 4 ml. of 88% ammonia. After 30 min. the mixture is cooled to 10° C. and the solid, which separates, is collected by filtration, washed with water and dried. The yield of o-trifluoromethylphenylthiourea is 18.8 g. (91%), m.p. 165°–166° C. To a stirred mixture of 31.5 g. o-trifluoromethylphenylthiourea in 135 ml. of 1,2-dichloroethane is added below 30° C a solution of 9 ml. of bromine in 65 ml. of 1,2-dichloroethane. The mixture is stirred under reflux for 3.7 hr., cooled to 10° C. and the solid collected by filtration, washed with 1,2-dichloroethane and dried. The solid is stirred into 400 ml. of water, basified with ammonia, filtered and dried. The yield of 2-amino-4-trifluoromethylbenzothiazole is 25.6 g. (82%).

The preparation of a dye in accordance with the invention will now be described by way of illustration.

EXAMPLE 1

Sodium nitrite (0.72 g., 0.01 mole) was added slowly in portions with stirring to concentrated sulphuric acid (5 ml.) at below 70° C. The mixture was warmed to 70° C. for 5 minutes and the resultant solution cooled to room temperature. Concentrated sulphuric acid (14 ml.) was added to a stirred suspension of 2-amino-4-trifluoromethylbenzothiazole (2.18 g., 0.01 mole) in water (24 ml.). The mixture was cooled to 0° C. and the solution of sodium nitrite in sulphuric acid was added while the temperature was kept below 3° C. Diazotization was allowed to proceed for 2 hours at 0° C. and the diazo solution was then added slowly to a well-stirred mixture of 2,5-dimethyl N-sec-butyl aniline (2.2 g., 0.0125 mole), anhydrous sodium acetate (12 g.) and ethanol (60 ml.), while the temperature was kept below 6° C. Coupling was allowed to proceed for 30 minutes at 6° C. and the mixture was then poured into cold water and stirred for 5 minutes. The solid dye was filtered off, washed with water and dried.

EXAMPLES 2–9

By the procedure of Example 1, eight further dyes in accordance with the invention were prepared from 2-amino-4-trifluoromethylbenzothiazole and the following couplers:

Table I

| Example No. | Coupler |
|---|---|
| 2 | N,N-diethyl aniline |
| 3 | N,N-diethyl-m-toluidine |
| 4 | 2,5-dimethyl N-ethylaniline |
| 5 | 3,5-dimethyl N,N-diethylaniline |
| 6 | N,N-diethyl m-chloroaniline |
| 7 | N,N-dipropylaniline |
| 8 | N-ethyl o-ethylaniline |
| 9 | N-methyl o-methylaniline |

EXAMPLE 10

By the procedure of Example 1, a dye in accordance with the invention was prepared from 2-amino-6-trifluoromethylbenzothiazole and N,N-diethylaniline.

EXAMPLE 11

By the procedure of Example 1, a dye in accordance with the invention was prepared from 2-amino-6-trifluoromethylbenzothiazole and 2,5-dimethyl N-sec-butylaniline.

EXAMPLE 12

By the procedure of Example 1, a mixture of dyes in accordance with the invention was prepared from N,N-diethylaniline and a mixture of approximately equal parts of 2-amino-5-trifluoromethylbenzothiazole and 2-amino-7-trifluoromethylbenzothiazole.

The following Table II shows $\lambda_{max}$(nm.) (measured in acetone) for each of the dyes of Examples 1–12.

Table II

| Example | $\lambda_{max}$(nm.) |
|---|---|
| 1 | 520 |
| 2 | 522 |
| 3 | 532 |
| 4 | 516 |
| 5 | 520 |
| 6 | 522 |
| 7 | 526 |
| 8 | 510 |
| 9 | 506 |
| 10 | 520 |
| 11 | 518 |

Table II-continued

| Example | $\lambda_{max}$(nm.) |
|---------|----------------------|
| 12      | 516                  |

The products of Examples 1-12 were used to prepare inks by the following procedure. A sample of each dye was ball-milled in ethanol:ethylene glycol (9:1 by volume) with ethyl cellulose thickener for 48 hours. The resulting ink was applied to pieces of flexographic paper by roller coating and allowed to dry. Pieces of the paper were then used for transfer printing onto nylon fabric at 200° C. for 30 seconds, and onto polyester fabric at 210° C. for 30 seconds. Bright scarlet to bluish-red prints were produced, having generally good strength and good fastness properties.

Light fastness was determined by exposure in a Xenotest 150 apparatus for 40 hours. The fading was assessed on the International Grey Scale, on which severe fading = 1, no fading = 5. Wash fastness on polyester fabric and on nylon 6.6 fabric was determined by the ISO3 and ISO2 procedures, respectively. Values for the dyes of Examples 3 and 10 were as follows:

Table III

| | On Polyester | | On nylon 6.6 | |
|---|---|---|---|---|
| Dye | Light Fastness | Wash Fastness | Light Fastness | Wash Fastness |
| Example 3 | 4–5 | 5 | 4 | 3–4 |
| Example 10 | 5 | 5 | 3 | 3–4 |

When used in transfer printing, the dyes of Examples 1-12 are of satisfactory compatibility with other transfer printing dyes, such as Disperse Yellow 3 and Disperse Blue 3.

EXAMPLES 13-20

By the procedure of Example 1, dyes in accordance with the invention may be prepared from 2-amino-4-trifluoromethylbenzothiazole and the following couplers:
a. N-ethyl-N-cyanoethylaniline;
b. N-ethyl-N-hydroxyethylaniline;
c. N-ethyl-N-succinimidoethylaniline;
d. N-ethyl-N-succinimidoethyl-m-toluidine;
e. N,N-diethyl-m-acetamidoaniline;
f. N-hydroxyethyl-2,2,4-trimethyltetrahydroquinoline;
g. N-ethyl-6-acetamidobenzomorpholine; and
h. N,N-bis(hydroxyethyl)-2-methoxy-5-acetamidoaniline.

EXAMPLES 21-28

By the procedure of Example 1, dyes in accordance with the invention may be prepared from 2-amino-6-trifluoromethylbenzothiazole and the couplers identified by the letters (a) to (h) in Examples 13 to 20.

EXAMPLES 29-36

By the procedure of Example 1, mixtures of dyes in accordance with the invention may be prepared from a mixture of approximately equal parts of 2-amino-5-trifluoromethylbenzothiazole and 2-amino-7-trifluoromethylbenzothiazole and the couplers identified by the letters (a) to (h) in Examples 13 to 20.

The estimated colours of the dyes of Examples 13-36 are shown in Table IV.

Table IV

| | Examples | | |
|---|---|---|---|
| Coupler | 13-20 | 21-28 | 29-36 |
| (a) | scarlet | scarlet | scarlet |
| (b) | red | red | red |
| (c) | red | red | red |
| (d) | bluish-red | bluish-red | bluish-red |
| (e) | bluish-red | bluish-red | bluish-red |
| (f) | bluish-red | bluish-red | bluish-red |
| (g) | violet | violet | violet |
| (h) | bluish-red | bluish-red | bluish-red |

The dyes of Examples 13-36 are expected to be of particular utility in conventional dyeing procedures, for example, exhaust dyeing.

The azo dyes set forth in the following Tables V, VI, and VII are prepared according to the synthetic techniques described herein and conform to the formula at the head of each Table.

Table V

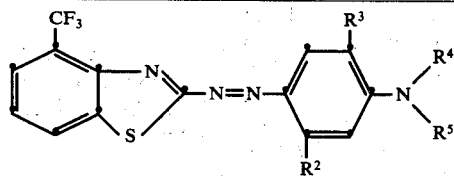

| Example No. | $R^2, R^3$ | $R^4$ | $R^5$ |
|---|---|---|---|
| 37 | 3-NHCOCH$_3$ | —C$_2$H$_5$ | —C$_2$H$_5$ |
| 38 | 3-NHCOCH$_3$ | —CH$_2$C$_6$H$_5$ | —C$_2$H$_5$ |
| 39 | 3-CH$_3$ | —CH$_2$CH$_2$CN | —C$_2$H$_5$ |
| 40 | 3-NHCOCH$_3$ | —CH$_2$CH$_2$OOCCH$_3$ | —C$_2$H$_5$ |
| 41 | 3-NHCOCH$_3$ | —C$_6$H$_{11}$ | —CH$_2$CH$_2$OOCCH$_3$ |
| 42 | 3-NHCOCH$_3$ | —CH$_2$C$_6$H$_{11}$ | —C$_2$H$_5$ |
| 43 | 3-NHCOCH$_3$ | —C$_6$H$_{11}$ | —C$_2$H$_5$ |
| 44 | 3-CH$_3$ | —CH$_2$CH$_2$OOCCH$_3$ | —C$_2$H$_5$ |
| 45 | 3-NHCOCH$_3$ | —CH$_2$CH$_2$OOCCH$_3$ | —CH$_2$CH$_2$OOCCH$_3$ |
| 46 | 3-NHCOCH$_3$ | —CH$_2$CH$_2$NCOCH$_2$CH$_2$CO⌐ ┐ | —C$_2$H$_5$ |
| 47 | 3-NHCOCH$_3$ | —C$_2$H$_5$ | —CH$_2$CH$_2$CH$_3$ |
| 48 | 3-NHCOCH$_3$ | —CH$_2$CH$_2$CN | —CH$_2$CH$_2$OOCCH$_3$ |
| 49 | 3-NHCOCH$_3$ | —CH$_2$CH$_2$CONH$_2$ | —CH$_2$CH$_2$OOCCH$_3$ |
| 50 | 3-NHCOCH$_3$ | —C$_2$H$_5$ | —CH$_2$CH$_2$OH |
| 51 | 3-NHCOCH$_3$ | —CH$_2$CH$_2$OH | —CH$_2$C$_6$H$_5$ |
| 52 | 3-NHCOCH$_3$ | —CH$_2$CH$_2$S—C=NNHCH=N⌐ ┐ | —C$_2$H$_5$ |
| 53 | 3-NHCOCH$_3$ | —CH$_2$C$_6$H$_5$ | —CH$_2$CH$_2$OOCH$_3$ |
| 54 | —H | —C$_2$H$_5$ | —C$_2$H$_5$ |

Table V-continued

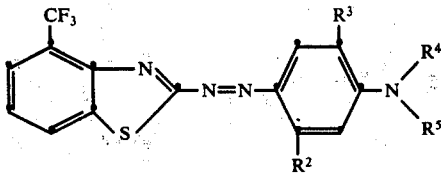

| Example No. | R², R³ | R⁴ | R⁵ |
|---|---|---|---|
| 55 | —H | —C₂H₅ | —CH₂CH₂CH₃ |
| 56 | —H | —CH₂CH₂OOCCH₃ | —CH₂CH₂OOCCH₃ |
| 57 | 3-NHCOCH₃ | —CH₂CH₂OOCCH₂CH₃ | —CH₂CH₂OOCCH₃ |
| 58 | H | —CH₂CH₂CN | —CH₂CH₂OOCCH₃ |
| 59 | 3-NHCOCH₃ | —C₂H₅ | —CH₂CH(CH₃)OOCCH₃ |
| 60 | 3-NHCOCH₃ | —CH₂CH₂CONH₂ | —C₂H₅ |
| 61 | 3-NHCOCH₃ | —C₂H₅ | —CH₂CH=CH₂ |
| 62 | 3-NHCOCH₃ | —CH₂CH₂NHCOCH₃ | —C₂H₅ |
| 63 | 3-NHCOCH₃ | —CH₂CH₂NHCOC₆H₅ | —C₂H₅ |
| 64 | 3-NHCOCH₃ | —CH₂CH₂NHCOOC₂H₅ | —C₂H₅ |
| 65 | 3-NHCOCH₃ | —CH₂C₆H₅ | —CH₂CH₂COOCH₃ |
| 66 | 3-NHCOCH₃ | —CH₂C₆H₁₁ | —CH₂CH₂OOCCH₃ |
| 67 | 2-CH₃-5-NHCOCH₃ | —C₂H₅ | H |
| 68 | 2-CH₃-5-NHCOCH₃ | —CH(CH₃)C₂H₅ | H |
| 69 | 2-CH₃-5-NHCOCH₃ | —C₆H₁₁ | H |
| 70 | 2-CH₃-5-NHCOCH₃ | —CH₂C₆H₅ | H |
| 71 | 2-CH₃-5-NHCOCH₃ | —CH₂CH₂CN | H |
| 72 | 2-CH₃-5-NHCOCH₃ | —CH₂CH₂OOCCH₃ | H |
| 73 | 3-NHCOCH₃ | —C₂H₄Cl | —CH₂CH₂OOCCH₃ |
| 74 | 3-CH₃ | —CH₂CH₂CN | —CH₂CH₂OOCCH₃ |
| 75 | H | —CH₂CH₂CONH₂ | —CH₂CH₂OOCCH₃ |
| 76 | 3-NHCOCH₃ | —C₂H₄OH | —CH₂CH₂CH₃ |
| 77 | 3-NHCOCH₃ | —C₂H₄OH | —CH₂CH₂CN |
| 78 | 3-NHCOCH₃ | —C₂H₅ | —CH₂CH₂OOCNHC₆H₅ |
| 79 | 3-NHCOCH₃ | —C₂H₅ | —CH₂CH₂OOCNHC₂H₅ |
| 80 | 3-NHCOCH₃ | —C₆H₁₁ | —CH₂CH₂OH |
| 81 | 3-NHCOCH₃ | —CH₂C₆H₁₁ | —C₂H₄OOCNHC₂H₅ |
| 82 | 3-NHCOCH₃ | —C₂H₅ | —C₃H₆NHCONHC₂H₅ |
| 83 | 3-NHCOCH₃ | —CH₂CH₂NCOCH₂CH₂CO— | —C₂H₄CN |
| 84 | 3-NHCOCH₃ | —CH₂CH₂CH₃ | —C₂H₄CN |
| 85 | 3-NHCOCH₃ | —C₆H₁₁ | —CH₂CH₂CH₃ |
| 86 | 3-NHCOCH₃ | —C₂H₅ | —CH₂CH₂CH₂OH |
| 87 | 3-NHCOCH₃ | —C₂H₅ | —CH₂CH₂CH₂NHCOCH₃ |
| 88 | 3-CH₃ | —C₆H₁₁ | —C₂H₅ |
| 89 | 3-NHCOCH₃ | —C₂H₅ | —CH₂CH₂CH₃ |
| 90 | 3-CH₃ | —C₂H₅ | —CH₂CH₂OOCCH₃ |
| 91 | 3-CH₃ | —C₂H₅ | —CH₂CH₂OOCNHC₂H₅ |
| 92 | 3-CH₃ | —C₂H₅ | —CH₂CH₂OC₆H₅ |
| 93 | 2-OCH₃-5-NH-COCH₃ | —CH₂CH₂OOCCH₃ | —CH₂CH₂OOCCH₃ |
| 94 | 2-OCH₃-5-CH₃ | —CH₂CH₂OOCCH₃ | —CH₂CH₂OOCCH₃ |
| 95 | 2,5-di-OCH₃ | —CH₂CH₂OOCCH₃ | —CH₂CH₂OOCCH₃ |
| 96 | 2-CH₃-5-OCH₃ | —CH₂CH₂OOCCH₃ | —CH₂CH₂OOCCH₃ |
| 97 | 3-NHCOCH₃ | —C₂H₅ | —CH₂CH(CH₃)OH |
| 98 | 3-CH₃ | —C₂H₅ | —C₂H₅ |
| 99 | 3-CH₃ | —C₂H₄C₆H₅ | —C₂H₅ |
| 100 | 3-CH₃ | —C₂H₄C₆H₁₁ | —C₂H₅ |
| 101 | 3-CH₃ | —C₂H₄OH | —C₂H₅ |
| 102 | 3-CH₃ | —C₂H₄CONH₂ | —C₂H₅ |
| 103 | 3-CH₃ | —C₂H₄CONHC₆H₅ | —C₂H₅ |
| 104 | 3-NHCOC₂H₅ | —C₂H₅ | —CH₂CH₂OOCCH₃ |
| 105 | 3-NHCOH | —C₂H₅ | —CH₂CH₂OOCCH₃ |
| 106 | H | —CH₂C₆H₅ | —CH₂CH₂OOCCH₃ |
| 107 | H | —C₃H₆NHCOCH₃ | —CH₂CH₂OOCCH₃ |
| 108 | H | —C₂H₄NCOCH₂CH₂CO— | —CH₂CH₂OOCCH₃ |
| 109 | 3-NHCOC₂H₅ | —C₂H₅ | —C₂H₅ |
| 110 | 3-NHCOH | —C₂H₄OOCCH₃ | —C₂H₅ |
| 111 | H | —C₂H₄OOCCH₃ | —C₂H₅ |
| 112 | H | —C₂H₄CN | —C₂H₅ |
| 113 | H | —C₂H₄OH | —C₂H₅ |
| 114 | H | —C₂H₄CONH₂ | —C₂H₅ |
| 115 | H | —C₂H₄NCOCH₂CH₂CO— | —C₂H₅ |
| 116 | H | —C₂H₄NHCOCH₃ | —C₂H₅ |
| 117 | H | —C₂H₄NHCOC₆H₅ | —C₂H₅ |
| 118 | H | —C₃H₆NHCOCH₃ | —C₂H₅ |
| 119 | H | —C₂H₄C₆H₅ | —C₂H₅ |
| 120 | H | —C₂H₄SO₂C₆H₅ | —C₂H₅ |
| 121 | H | —C₂H₄SO₂CH₃ | —C₂H₅ |
| 122 | H | —C₂H₄OC₂H₄OH | —C₂H₅ |
| 123 | H | —C₂H₄SC=NNHCH=N— | —C₂H₅ |
| 124 | H | —CH₂CH(OH)CH₂OH | —C₂H₅ |
| 125 | 3-NHCOOC₂H₅ | —C₂H₅ | —C₂H₅ |
| 126 | 3-NHCOOC₂H₅ | —CH₂C₆H₅ | —CH₂C₆H₅ |
| 127 | 3-NHCOC₆H₅ | —C₂H₅ | —C₂H₅ |

Table V-continued

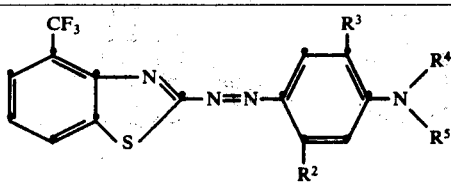

| Example No. | R², R³ | R⁴ | R⁵ |
|---|---|---|---|
| 128 | 3-NHCOC₆H₅ | —C₂H₅ | —CH₂CH₂OOCCH₃ |
| 129 | 3-NHCOC₆H₁₁ | —C₂H₅ | —CH₂CH₂OOCCH₃ |
| 130 | 2-CH₃-5-NHCOC₆H₅ | H | —CH₂(CH₃)C₂H₅ |
| 131 | 3-NHCOCH₂OH | —C₂H₅ | —C₂H₅ |
| 132 | 3-NHCOCH₂Cl | —C₂H₅ | —C₂H₅ |
| 133 | 3-NHCOCH₂OCH₃ | —C₂H₅ | —C₂H₅ |
| 134 | 3-NHCOCH₂CH₂Cl | —C₂H₅ | —C₂H₅ |
| 135 | 3-NHCOCH₂OC₆H₅ | —C₂H₅ | —C₂H₅ |
| 136 | 3-NHCOCH₂C₆H₅ | —C₂H₅ | —C₂H₅ |
| 137 | 3-NHSO₂CH₃ | —C₂H₅ | —C₂H₅ |
| 138 | 3-NHCOCH₂CH₂CN | —C₂H₅ | —C₂H₅ |
| 139 | 3-NHCONHC₂H₅ | —C₂H₅ | —C₂H₅ |
| 140 | 3-NHCONHC₆H₅ | —C₂H₅ | —C₂H₅ |
| 141 | 3-NHCOCH₂OOCCH₃ | —C₂H₅ | —C₂H₅ |
| 142 | 3-NHCOCH₃ | ⌐—CH₂CH₂NCO—o-C₆H₄CO—⌐ | —C₂H₅ |
| 143 | H | ⌐—CH₂CH₂NCO—o-C₆H₄CO—⌐ | —C₂H₅ |
| 144 | 3-NHCOCH₃ | ⌐—CH₂CH₂NCOCH₂NHCO—⌐ | —C₂H₅ |
| 145 | 3-CH₃ | ⌐—CH₂CH₂NCOCH₂NHCO—⌐ | —C₂H₅ |
| 146 | 3-NHCOCH₃ | —CH₂CH₂N(CH₃)SO₂CH₃ | —C₂H₅ |
| 147 | 3-NHCOCH₃ | —CH₂CH₂N(C₂H₅)SO₂C₆H₅ | —C₂H₅ |
| 148 | 3-NHCOCH₃ | ⌐—CH₂CH₂NCO—o—C₆H₄SO₂—⌐ | —C₂H₅ |
| 149 | 3-NHCOCH₃ | —CH₂CH₂NH(C₆H₅)SO₂CH₃ | —C₂H₅ |
| 150 | 3-NHCOCH₃ | —CH₂CH₂—SO₂—CH₂CH₂— | |
| 151 | 3-NHCOCH₃ | —CH₂CH₂OCH₂CH₂— | |
| 152 | 3-NHCOCH₃ | —(CH₂)₅— | |
| 153 | 3-NHCOCH₃ | —CH₂CH₂N(SO₂CH₃)CH₂CH₂— | |
| 154 | 3-NHCOCH₃ | —CH₂—C₆H₄—p-COOCH₃ | —C₂H₅ |
| 155 | 3-NHCOCH₃ | —CH₂CH(OOCH₃)CH₂OOCH₃ | —C₂H₅ |
| 156 | 3-NHCOCH₃ | —CH₂CH(OOCH)CH₂Cl | —C₂H₅ |
| 157 | 3-NHCOCH₃ | —CH₂CH₂OC₂H₅ | —C₂H₅ |
| 158 | 3-NHCOCH₃ | —CH₂CH₂OOCC₆H₅ | —C₂H₅ |
| 159 | 3-NHCOCH₃ | —CH₂CH₂OOCCH₂OC₆H₅ | —C₂H₅ |
| 160 | 3-NHCOCH₃ | —CH₂CH₂OOCCH₂C₆H₅ | —C₂H₅ |
| 161 | 3-NHCOCH₃ | —CH₂CH₂OOCH₂COCH₃ | —C₂H₅ |
| 162 | 3-NHCOCH₃ | —CH₂CH₂OOCCH₂CN | —C₂H₅ |
| 163 | 3-NHCOCH₃ | —CH₂CH₂OOCCH₂CH₂OCH₃ | —C₂H₅ |
| 164 | 3-NHCOCH₃ | —CH₂CH₂OOCCH₂CH₂—COOC₂H₅ | —C₂H₅ |
| 165 | 3-NHCOCH₃ | —CH₂C₆H₅ | —CH₂C₆H₄—p-COOCH₃ |
| 166 | 3-NHCOCH₃ | —CH₂C₆H₁₁ | —CH₂C₆H₄p-COOCH₃ |
| 167 | 3-NHCOCH₃ | —CH₂C₆H₅ | —C₆H₁₁ |
| 168 | 3-NHCOCH₃ | —CH₂C₆H₁₁ | —C₆H₁₁ |
| 169 | 3-NHCOCH₃ | —CH₂C₆H₁₁ | —CH₂CH₂CONHCH(CH₃)₂ |
| 170 | 3-NHCOCH₃ | —C₆H₁₁ | —CH₂CH₂OOCOC₂H₅ |
| 171 | 3-NHCOCH₃ | —C₆H₁₁ | —CH₂CH₂CN |
| 172 | 3-NHCCCH₃ | —C₂H₅ | —CH₂CH₂CH₃ |
| 173 | H | —C₆H₁₁ | —C₂H₅ |
| 174 | H | —CH₂C₆H₅ | —C₂H₅ |
| 175 | 3-NHCOCH₃ | —CH₂CH₂OOCOCH₃ | —C₂H₅ |
| 176 | 3-CH₃ | —CH₂CH₂OOCOCH₃ | —C₂H₅ |
| 177 | 3-NHCOCH₃ | ⌐—CH₂CH₂NCO(CH₂)₃CO—⌐ | —C₂H₅ |
| 178 | 3-CH₃ | ⌐—CH₂CH₂NCO(CH₂)₃CO—⌐ | —C₂H₅ |
| 179 | 2,5-di-CH₃ | —CH₂CH₂(C₂H₅)CH₃ | H |
| 180 | 2,5-di-CH₃ | —CH₂CH₂CH₃ | H |
| 181 | 3-NHCOCH₃ | —CH₂CH(C₂H₅)(CH₂)₃CH₃ | —C₂H₅ |
| 182 | 2,5-di-CH₃ | ⌐—CH₂CH₂NHCOCH₂CH₂CO—⌐ | H |
| 183 | 2-CH₃-5-NHCOCH₃ | —C₂H₅ | H |
| 184 | 2-CH₃-5-NHCOCH₃ | —CH₂C₆H₅ | H |
| 185 | 2-CH₃-5-NHCOCH₃ | —C₆H₁₁ | H |
| 186 | 3-NHCOCH₃ | —CH₂CH₂OOCC₆H₅ | —(CH₂)₃CH₃ |
| 187 | 3-NHCOCH₃ | —CH₂CH₂OOCOC₂H₅ | —CH₂CH(CH₃)₂ |
| 187 | | | |
| 188 | 3-NHCOCH₃ | —C₆H₁₁ | —CH₂CH(OOCCH₃)CH₃ |
| 189 | 3-NHCOCH₃ | —C₆H₁₁ | —CH₂C₆H₅ |

Table V-continued

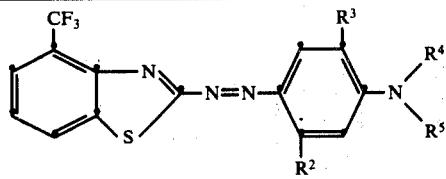

| Example No. | $R^2, R^3$ | $R^4$ | $R^5$ |
|---|---|---|---|
| 190 | 3-CH$_3$ | —CH$_2$CH(OOCCH$_3$)CH$_3$OOCCH$_3$ | —C$_2$H$_5$ |
| 191 | 2-CH$_3$-5-NHCOC$_6$H$_5$ | —CH(CH$_3$)C$_2$H$_5$ | H |
| 192 | 3-NHCOC$_2$H$_5$ | —CH$_2$CH(CH$_3$)$_2$ | —CH$_2$CH$_2$CH$_3$ |
| 193 | 3-NHCOC$_2$H$_5$ | —CH$_2$C$_6$H$_4$-p-COOH$_3$ | —CH$_2$CH$_2$CH$_3$ |
| 194 | 3-NHCOC$_2$H$_5$ | —CH$_2$C$_6$H$_{11}$ | —CH$_2$CH$_2$OOCH$_3$ |
| 195 | 3-NHCOC$_2$H$_5$ | —CH$_2$CH$_2$CN | —C$_2$H$_5$ |
| 196 | 3-NHCOC$_2$H$_5$ | —CH$_2$CH$_2$CONH$_2$ | —C$_2$H$_5$ |
| 197 | 3-NHCOC$_2$H$_5$ | —CH$_2$CH$_2$CONHCH(CH$_3$)$_2$ | —C$_2$H$_5$ |
| 198 | 3-NHCOC$_2$H$_5$ | —CH$_2$CH$_2$OC$_6$H$_5$ | —C$_2$H$_5$ |
| 199 | 3-NHCOCH(CH$_3$)$_2$ | —C$_2$H$_5$ | —C$_2$H$_5$ |
| 200 | 2-OCH$_3$-5-NHCOCH$_3$ | —C$_2$H$_5$ | —C$_2$H$_5$ |
| 201 | 2-OCH$_3$-5-NHCOCH$_3$ | —C$_2$H$_5$ | —C$_2$H$_4$CN |
| 202 | 2-OCH$_3$-5-NHCOCH$_3$ | —C$_2$H$_5$ | —C$_2$H$_4$OOCCH$_3$ |
| 203 | 2-OCH$_3$-5-NHCOCH$_3$ | —C$_2$H$_5$ | —C$_2$H$_4$NHCOCH$_3$ |
| 204 | 2-OCH$_3$-5-NHCOCH$_3$ | —C$_2$H$_5$ | —C$_2$H$_4$OH |
| 205 | 2-OCH$_3$-5-NHCOCH$_3$ | —C$_2$H$_5$ | —C$_2$H$_4$C$_6$H$_5$ |
| 206 | 2-OCH$_3$-5-NHCOCH$_3$ | —C$_2$H$_5$ | —C$_2$H$_4$NCOCH$_2$CH$_2$CO |
| 207 | 2-OCH$_3$-5-NHCOCH$_3$ | —C$_2$H$_5$ | —CH$_2$C$_6$H$_5$ |
| 208 | 2-OCH$_3$-5-NHCOCH$_3$ | —C$_2$H$_4$COOCH$_3$ | —C$_2$H$_5$ |
| 209 | 2-OCH$_3$-5-NHCOCH$_3$ | —C$_2$H$_4$NHCO-p-C$_6$H$_4$CO— | —C$_2$H$_5$ |
| 210 | 2-OCH$_3$-5-NHCOCH$_3$ | —C$_2$H$_4$CN | H |
| 211 | 2-OCH$_3$-5-NHCOCH$_3$ | —C$_2$H$_4$CN | —C$_2$H$_4$OOCCH$_3$ |
| 212 | 2-OCH$_3$-5-NHCOCH$_3$ | H | —CH$_2$C$_6$H$_5$ |
| 213 | 3-NHCOC$_6$H$_{11}$ | —C$_2$H$_5$ | —C$_2$H$_5$ |
| 214 | 2-OCH$_3$-5-NHCOCH$_3$ | H | —C$_6$H$_{11}$ |
| 215 | 3-NHCOC$_6$H$_4$-p-COOCH$_3$ | —C$_2$H$_5$ | —C$_2$H$_5$ |
| 216 | H | —C$_2$H$_4$SO$_2$C$_2$H$_4$— | |
| 217 | H | —C$_2$H$_4$CH$_2$C$_2$H$_4$— | |
| 218 | H | —C$_2$H$_4$OC$_2$H$_4$— | |
| 219 | 3-NHCOCH$_2$CH$_2$OH | —C$_2$H$_5$ | —C$_2$H$_5$ |
| 220 | 2,5-di-CH$_3$ | H | —C$_2$H$_5$ |
| 221 | 2,5-di-CH$_3$ | H | —C$_4$H$_9$ |
| 222 | 3-NHCOCH$_3$ | —CH$_2$CH$_2$CN | —(CH$_2$)$_3$OOCCH$_3$ |
| 223 | H | —CH$_2$CH$_2$CN | —(CH$_2$)$_3$OOCCH$_3$ |
| 224 | 3-NHCOCH$_3$ | —CH$_2$CH$_2$OOCCH$_3$ | —CH$_2$CH$_2$OOCCH$_3$ |
| 225 | 3-CH$_3$ | —CH$_2$CH$_2$OOCCH$_3$ | —CH$_2$CH$_2$OOCCH$_3$ |
| 226 | 3-CH$_3$ | —CH$_2$CH$_2$SO$_2$CH$_2$CH$_2$— | |
| 227 | 3-CH$_3$ | —CH$_2$CH$_2$OCH$_2$CH$_2$— | |
| 228 | 3-NHCOCH$_3$ | —CH$_2$CH(OOCCH$_3$)CH$_2$Cl | —C$_2$H$_5$ |
| 229 | 3-NHCOCH$_3$ | —CH$_2$CH$_2$C$_6$H$_5$ | —C$_2$H$_5$ |
| 230 | 2,5-di-CH$_3$ | —CH$_2$C$_6$H$_{11}$ | H |
| 231 | 3-NHCOCH$_3$ | —CH$_2$C$_6$H$_5$ | —CH$_2$C$_6$H$_5$ |
| 232 | 3-QNHCOCH$_3$ | —CH$_2$C$_6$H$_5$ | —CH$_2$C$_6$H$_5$ |
| 233 | 3-NHCOCH$_3$ | —CH$_2$C$_6$H$_{10}$p-CH$_3$ | —CH$_2$CH$_2$CH$_3$ |

Table VI

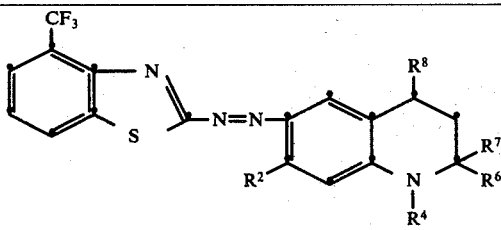

| Example No. | $R^2, R^6, R^7, R^8$ | $R^4$ |
|---|---|---|
| 234 | 2,2,4,7-tetra-CH$_3$ | —CH$_2$CH$_2$OH |
| 235 | 2,2,4-tri-CH$_3$-7-NHCOCH$_3$ | —C$_2$H$_5$ |
| 236 | 2,2,4,7-tetra-CH$_3$ | —(CH$_2$)$_3$NHCONHC$_2$H$_5$ |
| 237 | 2,2,4,7-tetra-CH$_3$ | —CH$_2$CH$_2$CONH$_2$ |
| 238 | 2,2,4,7-tetra-CH$_3$ | —(CH$_2$)$_3$NHCOCH$_3$ |
| 239 | 2,2,4,7-tetra-CH$_3$ | —CH$_2$CH$_2$Cl |
| 240 | 2,4-di-CH$_3$ | —(CH$_2$)$_3$NHCOCH$_3$ |
| 241 | 2,4-di-CH$_3$ | —CH$_2$CH$_2$CONH$_2$ |
| 242 | 2,2,4,7-tetra-CH$_3$ | —CH$_2$CH$_2$SC=NNHCH=N— |
| 243 | 2,2,4,7-tetra-CH$_3$ | —C$_2$H$_5$ |
| 244 | 2,2,4,7-tetra-CH$_3$ | —CH$_2$CH$_2$CN |
| 245 | 2,4-di-CH$_3$ | —C$_2$H$_5$ |
| 246 | 2,7-di-CH$_3$ | —CH$_2$CH$_2$CONH$_2$ |
| 247 | 2,7-di-CH$_3$ | —C$_2$H$_5$ |
| 248 | 2,7-di-CH$_3$ | —CH$_2$CH$_2$NHCOCH$_3$ |

Table VI-continued

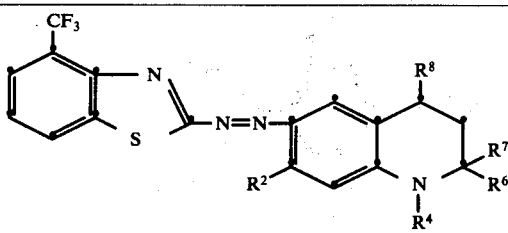

| Example No. | $R^2, R^6, R^7, R^8$ | $R^4$ |
|---|---|---|
| 249 | 2,2,4-tri-$CH_3$ | —$CH_2CH_2OOCCH_3$ |
| 250 | 2,2,4,7-tetra-$CH_3$ | —$CH_2CH(OH)CH_3$ |
| 251 | 2,2,4-tri-$CH_3$ | —$CH_2CH_2CONH_2$ |
| 252 | 2,2,4-tri-$CH_3$-7-Cl | —$C_2H_5$ |
| 253 | 2,2,4-tri-$CH_3$-5,8-di-$OCH_3$ | —$CH_2CH_2OH$ |
| 254 | 2,2,4-tri-$CH_3$-5,8-di-$CH_3$ | —$CH_2CH_2CN$ |
| 255 | 2,2,4,7-tetra-$CH_3$ | —$CH_2CH_2OOCCH_3$ |
| 256 | 2,2,4-tri-$CH_3$-7-NHCOCH$_3$ | —$CH_2CH_2OOCCH_3$ |
| 257 | 2,2,4-tri-$CH_3$-7-NHCOCH$_3$ | —$C_2H_4CONH_2$ |
| 258 | 2,2,4-tri-$CH_3$-7-NHCOOC$_2$H$_5$ | —$CH_2C_6H_5$ |
| 259 | 2,2,4-tri-$CH_3$-7-NHCOCH$_2$OH | —$C_2H_5$ |
| 260 | 2,2,4-tri-$CH_3$-7-NHCOCH$_2$Cl | —$C_2H_5$ |
| 261 | 2,2,4-tri-$CH_3$ | —$(CH_2)_3CH_3$ |
| 262 | 2,2,4,7-tetra-$CH_3$ | —$CH_2CH_2N(CH_2CH_2OH)SO_2CH_3$ |
| 263 | 2,2,4-tri-$CH_3$-7-NHCOC$_2$H$_5$ | —$CH_2CH_2OOCCH_3$ |
| 264 | 2-$CH_3$-7-NHCOCH$_3$ | —$CH_2CH_2OOCCH_2CH(CH_3)_2$ |
| 265 | 2,2,4-tri-$CH_3$-7-NHCOCH$_3$ | —$CH_2CH_2OOCOC_2H_5$ |
| 266 | 2,2,4-tri-$CH_3$-7-NHCOCH$_3$ | —$CH_2CH_2C_6H_5$ |
| 267 | 2,2,4-tri-$CH_3$-7-NHCOCH$_3$ | —$C_2H_4Cl$ |
| 268 | 2-$CH_3$-7-NHCOCH$_3$ | —$C_2H_4\overline{NCOCH_2CH_2CO}$ |
| 269 | 2,2,4-tri-$CH_3$-7-NHCOCH$_3$ | |
| 270 | 2,2,4-tri-$CH_3$-7-NHCOCH$_3$ | —$CH_2CH_2OOCC_6H_5$ |
| 271 | 2,2,4-tri-$CH_3$-7-NHCOCH$_3$ | —$CH_2CH_2\overline{NCOCH_2CH_2CO}$ |
| 272 | 2,2,4-tri-$CH_3$ | —$C_2H_5$ |
| 273 | 2,2,4-tri-$CH_3$ | —$CH_2CH_2CONHCH_3$ |
| 274 | 2,2,4-tri-$CH_3$ | —$CH_2CH_2CN$ |
| 275 | 2,2,4,7-tetra-$CH_3$ | —$CH_2CH_2\overline{NCOCH_2CH_2CO}$ |
| 276 | 2,2,4-tri-$CH_3$ | —$(CH_2)_3NHCOCH_3$ |
| 277 | 2,2,4-tri-$CH_3$ | —$CH_2CH_2OH$ |
| 278 | 2-$CH_3$ | —$CH_2CH_2CONH_2$ |
| 279 | 2-$CH_3$ | —$CH_2CH_2NHCOCH_3$ |
| 280 | 2,2,4,7-tetra-$CH_3$ | —$CH_2CH_2OOCCH_3$ |
| 281 | 2,2,4-tri-$CH_3$-7-NHCOCH$_3$ | —$CH_2CH_2CH_2NHCOCH_3$ |
| 282 | 2,2,4-tri-$CH_3$-7-NHCOCH$_3$ | —$C_2H_4SC_6H_5$ |
| 283 | 2,2,4-tri-$CH_3$-7-NHCOCH$_3$ | —$CH_2CH_2CN$ |
| 284 | 2,2,4-tri-$CH_3$-7-NHCOCH$_3$ | —$CH_2C_6H_5$ |
| 285 | 2,2,4-tri-$CH_3$-7-NHCOCH$_3$ | —$CH_2C_6H_{11}$ |
| 286 | 2-$CH_3$-7-NHCOCH$_3$ | —$CH_2CH_2C_6H_5$ |
| 287 | 2,2,4-tri-$CH_3$-7-NHCOCH$_3$ | —$CH_2CH(OH)CH_3$ |
| 288 | 2,2,4-tri-$CH_3$-7-NHCOCH$_3$ | —$CH_2CH_2N(CH_3)SO_2CH_3$ |
| 289 | 2,2,4-tri-$CH_3$-7-NHCOCH$_3$ | —$CH_2CH_2OC_2H_5$ |
| 290 | 2-$CH_3$-7-NHCOCH$_3$ | —$(CH_2)_3NHCONHC_2H_5$ |
| 291 | 2,2,4-tri-$CH_3$-5,8-di-$OCH_3$ | —$CH_2CH_2OOCCH_3$ |
| 292 | 2,2,4-tri-$CH_3$-5,8-di-$CH_3$ | —$C_2H_5$ |
| 293 | 2,2,4-tri-$CH_3$-5-$OCH_3$-8-$CH_3$ | —$C_2H_5$ |
| 294 | 2,2,-di-$CH_3$-7-NHCOCH$_3$ | —$C_2H_5$ |
| 295 | 2-$CH_3$-7-NHCOCH$_3$ | —$C_2H_5$ |
| 296 | 2,2,4-tri-$CH_3$-7-NHCOCH$_3$ | —$CH_2CH(OH)CH_2OH$ |
| 297 | 2-$CH_3$-7-NHCOCH$_3$ | —$CH_2CH_2OOCOC_2H_5$ |
| 298 | 2,2,4-tri-$CH_3$-7-NHCOCH$_3$ | —$CH_2CH_2OOCC_2H_5$ |
| 299 | 2-$CH_3$-7-NHCOCH$_3$ | —$CH_2CH_2OOCCH_3$ |
| 300 | 2,2-$CH_3$-7-NHCOCH$_3$ | —$CH_2CH_2OOCCH_3$ |
| 301 | 2,2,4-tri-$CH_3$-7-NHCOCH$_3$ | —$CH_2CH_2OOCH$ |
| 302 | 2,2,4-tri-$CH_3$-7-NHCOC$_6$H$_5$ | —$C_2H_5$ |
| 303 | 2,2,4-tri-$CH_3$-7-NHCOOC$_2$H$_5$ | —$C_2H_5$ |
| 304 | 2,2,4-tri-$CH_3$-7-NHCOC$_6$H$_5$ | —$C_2H_4OH$ |
| 305 | 2,2,4-tri-$CH_3$-7-NHCOCH | —$C_2H_5$ |
| 306 | 2-$CH(CH_3)_2$-7-NHCOCH$_2$C$_6$H$_5$ | —$C_2H_5$ |
| 307 | 2-$CH(CH_3)_2$-7-NHCOCH$_2$OH | —$C_2H_5$ |
| 308 | 2-$CH(CH_3)_2$-7-NHCOCH$_2$OOCCH$_3$ | —$C_2H_5$ |
| 309 | 2-$CH(CH_3)_2$-7-NHCOCH$_2$Cl | —$C_2H_5$ |
| 310 | 2,2,4-tri-$CH_3$-7-NHCOCH$_3$ | —$C_2H_4NHCONHC_6H_5$ |

Table VII

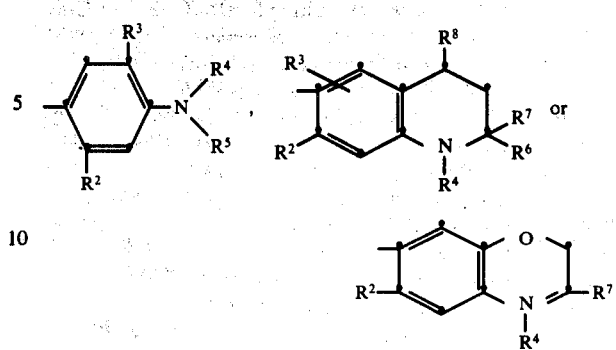

| Example No. | R², R⁷ | R⁴ |
|---|---|---|
| 311 | 3,6-di-CH₃ | —CH₂CH₂OH |
| 312 | 3,6-di-CH₃ | —CH₂CH₂CONH₂ |
| 313 | 3,6-di-CH₃ | —(CH₂)₃NHCOCH₃ |
| 314 | 3-CH₃-6-NHCOCH₃ | —C₂H₅ |
| 315 | 3,6-di-CH₃ | —(CH₂)₃NHCONHC₂H₅ |
| 316 | 3,6-di-CH₃ | —CH₂—CH₂Cl |
| 317 | 6-NHCOCH₃ | —(CH₂)₃NHCOCH₃ |
| 318 | 6-NHCOCH₃ | —CH₂CH₂CONH₂ |
| 319 | 3,6-di-CH₃ | —CH₂CH₂SC=NNHCH=N |
| 320 | 6-NHCOCH₃ | —C₂H₅ |
| 321 | 3,6-di-CH₃ | —CH₂CH₂CN |
| 322 | 3,6-di-CH₃ | —C₂H₅ |
| 323 | 3,6-di-CH₃ | —CH₂CH₂CONH₂ |
| 324 | 3,6-di-CH₃ | —C₂H₅ |
| 325 | 3,6-di-CH₃ | —CH₂CH₂NHCOCH₃ |
| 326 | 6-NHCOCH₃ | —CH₂CH₂OH |
| 327 | 3,6-di-CH₃ | —CH₂CH(OH)CH₃ |
| 328 | 3-CH₃ | —CH₂CH₂CONH₂ |
| 329 | 3-CH₃-6-Cl | —C₂H₅ |
| 330 | 3-CH₃-5,8-di-OCH₃ | —CH₂CH₂OH |
| 331 | 3-CH₃-5,8-di-CH₃ | —CH₂CH₂CN |
| 332 | 3-CH₃ | —C₂H₅ |
| 333 | 3,6-di-CH₃ | —CH₂CH₂CONHCH₃ |
| 334 | 3-CH₃ | —CH₂CH₂CN |
| 335 | 3,6-di-CH₃ | —CH₂CH₂NCOCH₂CH₂CO |
| 336 | 3-CH₃-6-NHCOCH₃ | —(CH₂)₃NHCOCH₃ |
| 337 | 3-CH₃ | —CH₂CH₂OH |
| 338 | 3,6-di-CH₃ | —CH₂CH(OH)CH₂OH |
| 339 | 3,6-di-CH₃ | —CH₂CH₂N(CH₃)SO₂CH₃ |
| 340 | 3,6-di-CH₃ | —CH₂CH₂OC₂H₅ |
| 341 | 3,6-di-CH₃ | —C₂H₄C₆H₅ |
| 342 | 3,6-di-CH₃ | —CH₂C₆H₅ |
| 343 | 3,6-di-CH₃ | —CH₂CH₂OOCCH₃ |
| 344 | 3,6-di-CH₃ | —CH₂CH₂OOCOC₂H₅ |
| 345 | 3,6-di-CH₃ | —CH₂CH₂OOCC₂H₅ |
| 346 | 3-CH₃-6-NHCOCH₃ | —CH₂CH₂OOCCH₃ |
| 347 | 3-CH₃ | —CH₂CH₂OOCCH₃ |
| 348 | 6-NHCOCH₃ | —CH₂CH₂OOCCH₃ |

The invention has been described in detail with particular reference to certain preferred embodiments thereof, but it will be understood that variations and modifications can be effected within the spirit and scope of the invention.

We claim:

1. A disperse diazo compound having the formula:

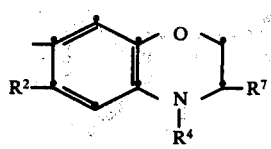

wherein R¹ is a substituent selected from the group consisting of hydrogen, methyl, ethyl, methoxy, ethoxy, halogen, nitro, acetyl, carboalkoxy, cyano, the thiocyanato, and A is a group having the formula:

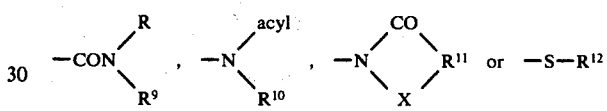

wherein R² is hydrogen, lower alkyl, lower alkoxy, trifluoromethyl, halogen, or a group having the formula —NH-acyl; R³ is hydrogen, lower alkyl or lower alkoxy; R⁴ individually is alkyl containing one to eight carbon atoms; cyclohexyl; cyclohexyl substituted with lower alkyl; or lower alkyl substituted with lower alkoxy, aryl, aryloxy, cyclohexyl, cyano, hydroxy, lower alkanoyloxy, methylsulfonyl, lower alkoxycarbonyl, lower alkoxycarbonyloxy, aroyloxy, lower alkylcarbamoyloxy, arylcarbamoyloxy, or a group having the formula:

$$-CON\begin{matrix}R\\R^9\end{matrix}, -N\begin{matrix}acyl\\R^{10}\end{matrix}, -N\begin{matrix}CO\\X\end{matrix}R^{11} \text{ or } -S-R^{12}$$

wherein R individually is hydrogen, lower alkyl or aryl; R⁹ individually is hydrogen or lower alkyl; R and R⁹ collectively are —(CH₂)₅— or —CH₂CH₂OCH₂CH₂—; R¹⁰ is hydrogen, lower alkyl, aryl or cyclohexyl; R¹¹ is ethylene, propylene, trimethylene, o-cyclohexylene, or o-arylene; X is —CH₂—, —CO—, or —SO₂—; and R¹² is aryl, benzyl, cyclohexyl, 1,2,4-triazol-3-yl, or 2-benzothiazolyl; R⁵ individually is hydrogen, lower alkyl, lower alkyl substituted with hydroxy, cyano, lower alkoxy, aryl, aryloxy, cyclohexyl, lower alkanoyloxy, lower alkoxycarbonyl or lower alkoxycarbonyloxy; or aryl; R⁴ and R⁵ in combination is a group having the formula —CH₂CH₂—Y—CH₂CH₂— in which Y is —CH₂—, —O—, or —SO₂—; R⁶ is methyl, or, when R⁷ and R⁸ each is hydrogen, R⁶ can be lower akyl; R⁷ and R⁸ each is hydrogen or methyl; each aryl moiety is phenyl or phenyl substituted with lower alkyl, lower alkoxy, lower alkoxycarbonyl, chlorine or bromine; each acyl is formyl, lower alkanoyl, aroyl, cyclohexoyl, lower alkoxycarbonyl, lower alkylsulfonyl, carbamoyl, lower alkylcarbamoyl, or lower alkanoyl substituted with chlorine, hydroxy, aryl, cyano, lower alkoxy or aryloxy, or benzyloxy.

2. A compound according to claim 1 having the formula:

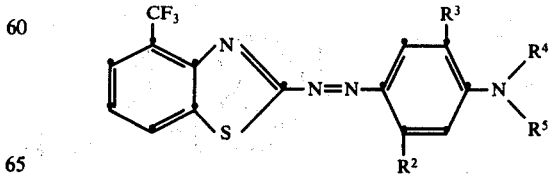

wherein R² is hydrogen, methyl, lower alkanoylamino, benzamido or trifluoromethyl; R³ is hydrogen, or, when R⁵ is hydrogen, R³ is methyl; R⁴ is lower alkyl, cyclohexyl, arylmethylene, cyclohexylmethylene, 2-cyanoethyl, 2-carbamoylethyl, N-lower alkyl-2-carbamoylethyl, N,N-di-lower alkyl-2-carbamoylethyl; or the group —Z—R¹³ in which Z is ethylene, propylene or trimethylene and R¹³ is hydroxy, lower alkanoyloxy, lower alkoxycarbonyl, lower alkoxycarbonyloxy, succinimido, phthalimido, aroyloxy, lower alkoxy, alkanoylamino, alkylcarbamoyloxy, alkylcarbamoylamino, or alkoxycarbonylamino; and R⁵ is hydrogen, lower alkyl, cyclohexyl, arylmethylene, cyclohexylmethylene, or the group —Z—R¹³.

3. A compound according to claim 1 having the formula:

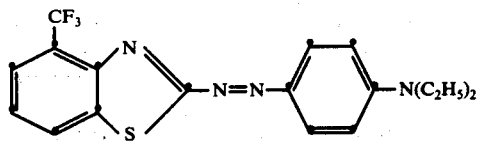

4. A compound according to claim 1 having the formula:

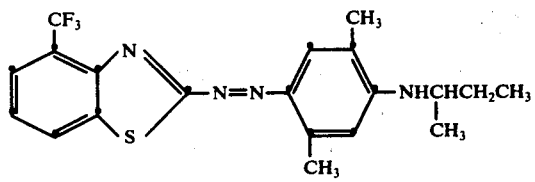

5. A compound according to claim 1 having the formula:

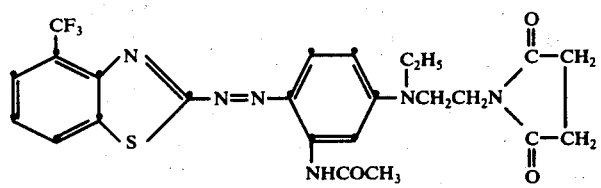

6. A compound according to claim 1 having the formula:

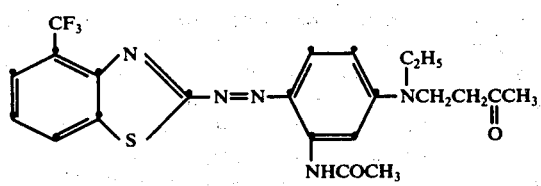

7. A compound according to claim 1 having the formula:

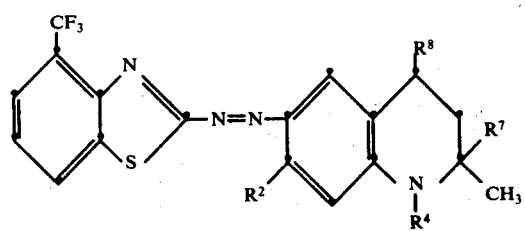

wherein R² is hydrogen, methyl, lower alkanoylamino, banzamido, or lower alkoxycarbonylamino; R⁴ is lower alkyl, cyclohexyl, arylmethylene, cyclohexylmethylene, 2-cyanoethyl, 2-carbamoylethyl, N-lower alkyl-2-carbamoylethyl, N,N-di-lower alkyl-2-carbamoylethyl, or the group —Z—R¹³ in which Z is ethylene, propylene or trimethylene, and R¹³ is hydroxy, lower alkanoyloxy, lower alkoxycarbonyl, lower alkoxycarbonyloxy, succinimido, glutarimido, phthalimido, aroyloxy, lower alkoxy, alkanoylamino, alkylcarbamoyloxy, alkylcarbamoylamino, or alkoxycarbonylamino; R⁷ and R⁸ each is hydrogen or methyl.

8. A compound according to claim 1 having the formula:

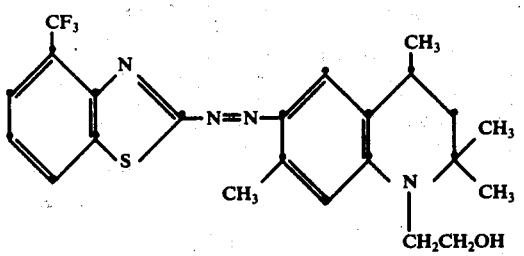

9. A compound according to claim 1 having the formula:

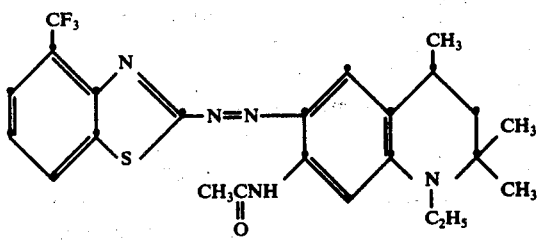

10. A compound according to claim 1 having the formula:

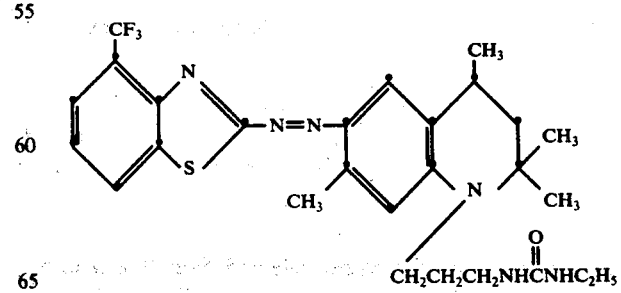

11. A compound according to claim 1 having the formula:

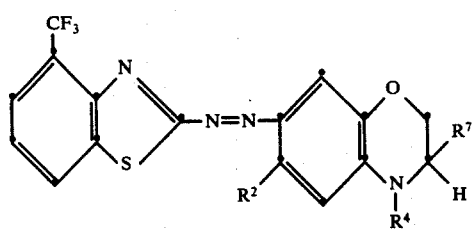
wherein R², R⁴ and R⁷ is according to claim 7.
12. A compound according to claim 1 having the formula:
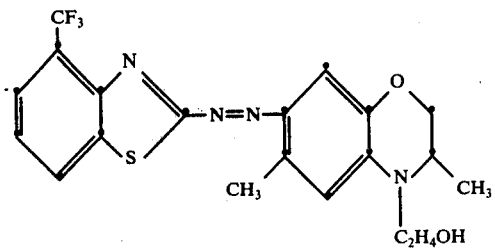

UNITED STATES PATENT OFFICE
CERTIFICATE OF CORRECTION

Patent No. 4,052,379  Dated October 4, 1977

Inventor(s) Robert N. Gourley

It is certified that error appears in the above-identified patent and that said Letters Patent are hereby corrected as shown below:

Column 2, line 12, "CO-," should read --- -CO-, ---.

Columns 7 and 8, Table V, under the column "$R^4$" in Example 46, "-$CH_2CH_2NCOCH_2CH_2CO$" should read --- -$CH_2CH_2NCOCH_2CH_2CO$ ---.

Columns 7 and 8, Table V, under the column "$R^5$" in Example 53, "-$CH_2CH_2OOCH_3$" should read --- -$CH_2CH_2OOCCH_3$ ---.

Columns 9 and 10, Table V, under the Column "$R^4$" in Example 83, "-$CH_2CH_2NCOCH_2CH_2CO$" should read --- -$CH_2CH_2NCOCH_2CH_2CO$ ---.

Columns 9 and 10, Table V, under the column "$R^5$" in Example 86, "-$CH_2CH_2Ch_2OH$" should read --- -$CH_2CH_2CH_2OH$ ---.

Columns 9 and 10, Table V, under the column "$R^5$" in Example 91, "-$CH_2Ch_2OOCNHC_2H_5$" should read --- -$CH_2CH_2OOCNHC_2H_5$ ---.

Columns 9 and 10, Table V, in the column "$R^4$" in Example 108, "-$C_2H_4NCOCH_2CH_2CO$" should read --- -$C_2H_4NCOCH_2CH_2CO$ ---.

Columns 9 and 10, Table V, in the column "$R^4$" in Example 115, "-$C_2H_4NCOCH_2CH_2CO$" should read --- -$C_2H_4NCOCH_2CH_2CO$ ---.

Columns 11 and 12, Table V, in the column "$R^4$" in Examples 142-143, in each instance, "-$CH_2CH_2NCO$-o-$C_6H_4CO$" should read --- -$CH_2CH_2NCO$-o-$C_6H_4CO$ ---.

Columns 11 and 12, Table V, under the column "$R^4$" in Example 148, "-$CH_2CH_2NCO$-o-$C_6H_4SO_2$" should read --- -$CH_2CH_2NCO$-o-$C_6H_4SO_2$ ---.

UNITED STATES PATENT OFFICE
CERTIFICATE OF CORRECTION

Page 2 of 2

Patent No. 4,052,379  Dated October 4, 1977

Inventor(s) Robert N. Gourley

It is certified that error appears in the above-identified patent and that said Letters Patent are hereby corrected as shown below:

Columns 11 and 12, Table V, under the column "$R^5$" in Example 166, "$-CH_2C_6H_4p-COOCH_3$" should read --- $-CH_2C_6H_4-p-COOCH_3$ ---.

Columns 11 and 12, Table V, under the column "$R^4$" in Example 182, "$-CH_2CH_2\overline{NHCOCH_2CH_2}CO$" should read --- $-CH_2CH_2\overline{NCOCH_2CH_2}CO$ ---.

Columns 11 and 12, Table V, under the column "Example No." delete the second occurrence of "187".

Columns 13 and 14, Table V, under the column "$R^4$" in Example 194, "$-CH_2H_6H_{11}$" should read --- $-CH_2C_6H_{11}$ ---.

Columns 13 and 14, Table V, under column "$R^4$" in Example 209, "$-C_2H_4\overline{NHCO-p-C_6H_4CO}$" should read --- $-C_2H_4\overline{NCO-p-C_6H_4CO}$ ---.

Columns 13 and 14, Table V, in the column "$R^2$, $R^3$" in Example 232, "3-QNHCOCH$_3$" should read --- 3-NHCOCH$_3$ ---.

Columns 13 and 14, Table V, under the column "$R^4$" in Example 233, "$-CH_2C_6H_{10}p-CH_3$" should read --- $-CH_2C_6H_{10}-p-CH_3$ ---.

Columns 15 and 16, Table VI, under the column "$R^4$" in Example 269 add --- $-C_2H_4OCONHC_6H_5$ ---.

Signed and Sealed this

Twenty-sixth Day of September 1978

[SEAL]

Attest:

RUTH C. MASON
Attesting Officer

DONALD W. BANNER
Commissioner of Patents and Trademarks

UNITED STATES PATENT AND TRADEMARK OFFICE
CERTIFICATE OF CORRECTION

PATENT NO. : 4,052,379
DATED : October 4, 1977
INVENTOR(S) : Robert N. Gourley

It is certified that error appears in the above-identified patent and that said Letters Patent are hereby corrected as shown below:

Column 17, lines 57-63, the formula should read

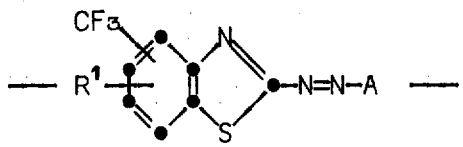

Column 17, line 66, after "cyano," the word "the" should read ---and---.

Signed and Sealed this

Thirty-first Day of October 1978

[SEAL]

Attest:

RUTH C. MASON
Attesting Officer

DONALD W. BANNER
Commissioner of Patents and Trademarks